United States Patent
Mizutani et al.

(10) Patent No.: US 10,416,002 B2
(45) Date of Patent: Sep. 17, 2019

(54) LIGHT SOURCE DEVICE AND PHOTOELECTRIC ENCODER INCLUDING THE SAME

(71) Applicant: Mitutoyo Corporation, Kawasaki, Kanagawa (JP)

(72) Inventors: Miyako Mizutani, Kanagawa (JP); Kimitoshi Ono, Kanagawa (JP); Fujio Maeda, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 173 days.

(21) Appl. No.: 15/784,803

(22) Filed: Oct. 16, 2017

(65) Prior Publication Data
US 2018/0106646 A1 Apr. 19, 2018

(30) Foreign Application Priority Data
Oct. 19, 2016 (JP) .................. 2016-205087

(51) Int. Cl.
*G01D 5/347* (2006.01)

(52) U.S. Cl.
CPC ..... *G01D 5/34715* (2013.01); *G01D 5/34707* (2013.01)

(58) Field of Classification Search
CPC ..... G02B 27/30; G02B 6/002; G01D 5/34715
See application file for complete search history.

(56) References Cited

U.S. PATENT DOCUMENTS 5,479,010 A * 12/1995 Shimomura ....... G01D 5/34715
                                                            250/231.13
5,841,133 A    11/1998 Omi

FOREIGN PATENT DOCUMENTS

JP       H10-132612        5/1998

* cited by examiner

*Primary Examiner* — Thanh Luu
(74) *Attorney, Agent, or Firm* — Rankin, Hill & Clark LLP

(57) ABSTRACT

Provided are a light source device that can achieve higher accuracy while maintaining reliability by reducing stray light, and a photoelectric encoder including the same. A light source device 2 includes a translucent member 10 configured to accommodate a light emitting unit 5 thereinside, and to make light emitted from the light emitting unit 5, into parallel light. The translucent member 10 includes an optical axis plane 11, an orthogonal plane 12, a reflection portion configured to make light from the light emitting unit 5, into parallel light, and a connection portion 14 formed by the optical axis plane 11 and the orthogonal plane 12 connecting to each other, and having a curved surface. A central axis AX of the curved surface is in an outside region of the translucent member 10, and a region between the optical axis plane 11 and the orthogonal plane 12.

5 Claims, 5 Drawing Sheets

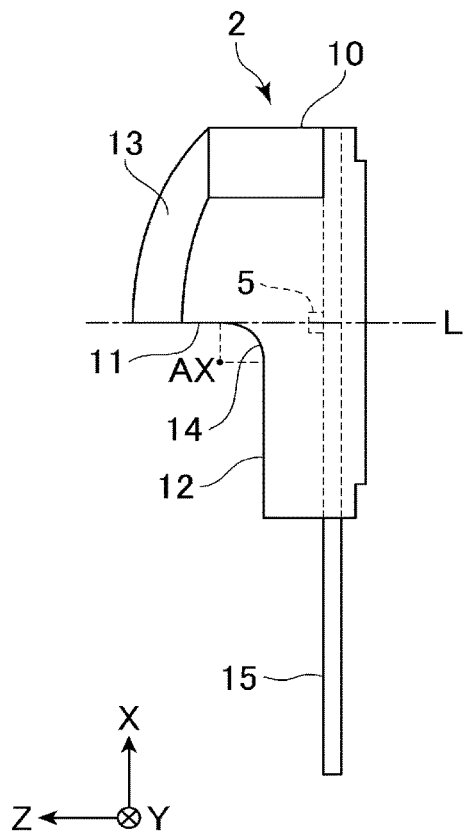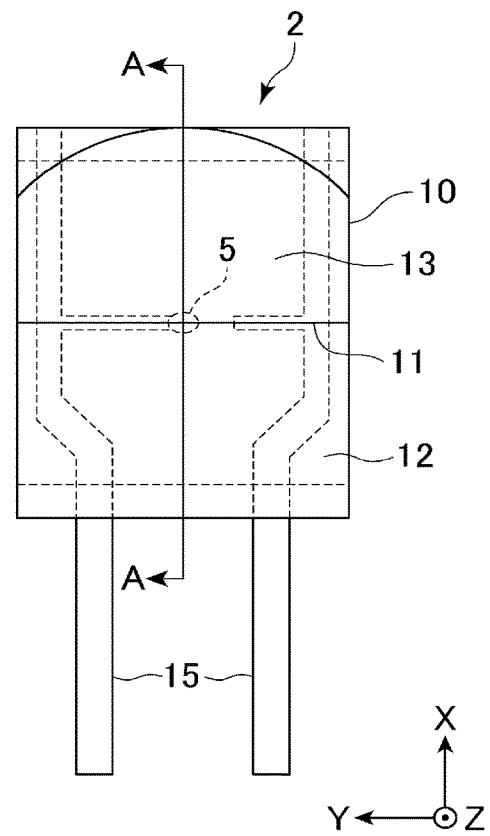
FIG. 2A  FIG. 2B
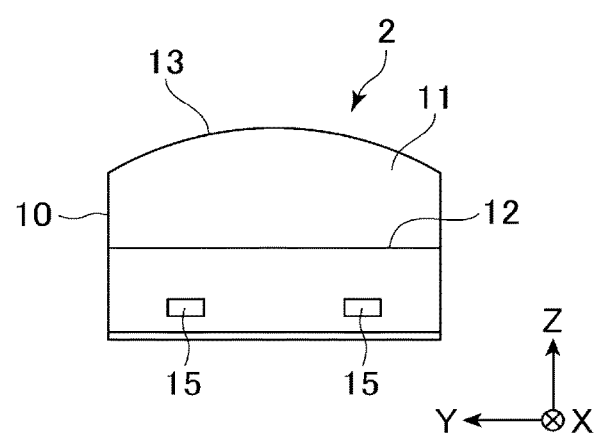
FIG. 2C

LIGHT SOURCE DEVICE AND PHOTOELECTRIC ENCODER INCLUDING THE SAME

CROSS-REFERENCE TO RELATED APPLICATION

This non-provisional application claims priority under 35 U.S.C. § 119(a) from Japanese Patent Application No. 2016-205087, filed on Oct. 19, 2016, the entire contents of which are incorporated herein by reference.

BACKGROUND

Technical Field

The present invention relates to a light source device that emits light, and a photoelectric encoder including the same.

Background Art

There has been conventionally known a photoelectric encoder that includes a scale having graduations, and a head including a light source device and a light receiving unit, and being configured to relatively move along the scale. The photoelectric encoder is configured to detect a displacement amount from an amount of a relative movement between the scale and the head. For example, an optical displacement detection device (photoelectric encoder) described in JP 10-132612 A includes a light emission unit (light source device) configured to emit parallel light, a main scale (scale) onto which parallel light of the light emission unit is emitted, and a light receiving unit configured to receive light via the main scale.

FIG. 7 is a cross-sectional view illustrating a conventional light emission unit.

As illustrated in FIG. 7, a light emission unit 100 used in this optical displacement detection device includes a light-emitting diode (LED) (light emitting unit) 101, transparent resin 103 being molded by injecting resin with the LED 101 being disposed thereinside, and including a plane (orthogonal plane) 102 orthogonal to an optical axis L of the LED 101, a lens member (translucent member) 105 being bonded to the transparent resin 103, and including a vertical plane (optical axis plane) 104 vertical to the plane 102, a reflection film (reflection member) 106 coating a surface (paraboloidal surface) of the lens member 105, a reflection plate 107 attached to the vertical plane 104, and an emission surface 108 that emits parallel light reflected by the reflection film 106, to the outside of the light emission unit 100.

The lens member 105 has a shape obtained by further halving an approximate hemispheroid, and has the surface coated with the reflection film 106 to function as a concave mirror. The light emission unit 100 obtains parallel light indicated by broken-line arrows, by disposing the LED 101 on an extended line of the vertical plane 104, and using light from the LED 101 that is emitted onto the reflection film 106 of the lens member 105.

By employing a shape obtained by further halving an approximate hemispheroid, as the shape of the lens member 105, the light emission unit 100 is downsized as compared with a case in which an approximate hemispheroid is employed.

The reflection plate 107 is provided for increasing light intensity of parallel light using light from a surrounding portion of the LED 101.

SUMMARY OF THE INVENTION

Problems to be Solved by the Invention

Nevertheless, in the above-described light emission unit 100, as illustrated in FIG. 7, because the lens member 105 is formed into a shape obtained by further halving an approximate hemispheroid, a corner portion 200 is formed by the plane 102 and the vertical plane 104. Here, among light emitted from the emission surface 108 to the outside of the light emission unit 100, light not being parallel light (broken-line arrows) is referred to as stray light (solid-line arrows). As indicated by the solid-line arrows in FIG. 7, the stray light is generated by light being emitted onto the corner portion 200. This is because the corner portion 200 serves as a scattering point of light. The light emission unit 100 accordingly has such a problem that parallel light containing stray light is emitted from the emission surface 108 due to the formation of the corner portion 200, and sufficient reliability cannot be maintained. In addition, if the stray light is emitted onto a scale of an optical displacement detection device, the stray light causes noise in the detection of a displacement amount. Thus, the optical displacement detection device including the light emission unit 100 has such a problem that detection accuracy cannot be sufficiently maintained.

The object of the present invention is to provide a light source device that can achieve higher accuracy while maintaining reliability by reducing stray light, and a photoelectric encoder including the same.

Means for Solving the Problems

A light source device of the present invention includes a light emitting unit configured to emit light, and a translucent member configured to accommodate the light emitting unit thereinside, and to make light emitted from the light emitting unit, into parallel light. The translucent member includes an optical axis plane positioned on an optical path of the light emitting unit, and being parallel to an optical axis of the light emitting unit, an orthogonal plane formed with being connected to an end portion on a light emitting unit side of the optical axis plane, positioned on the optical path of the light emitting unit, and being orthogonal to the optical axis of the light emitting unit, a reflection portion formed with being connected to an end portion on an opposite side of the light emitting unit of the optical axis plane toward an opposite side of the orthogonal plane, and configured to make light from the light emitting unit, into parallel light, and a connection portion formed by the optical axis plane and the orthogonal plane connecting to each other, and having a curved surface. A central axis of the curved surface is in an outside region of the translucent member and a region between the optical axis plane and the orthogonal plane.

According to the present invention as described above, because the connection portion of the translucent member is formed into a curved surface shape, a scattering point of light such as the corner portion 200 illustrated in FIG. 7 is not generated. More specifically, because part of light emitted onto the connection portion is transmitted through the curved surface of the connection portion, to be emitted to the outside of the translucent member, stray light can be reduced. Thus, the light source device can achieve higher accuracy while maintaining reliability by reducing stray light. In addition, because the translucent member includes the reflection portion formed with being connected to the other end side of the optical axis plane toward the opposite side of the orthogonal plane, the light source device can be downsized while ensuring necessary parallel light. Furthermore, because the translucent member includes the connection portion with curved surface, when the translucent member is molded by injecting transparent resin into a die or the like, for example, the translucent member can be easily demolded from the die or the like after the molding.

The connection portion preferably includes an antireflection member configured to absorb light from the light emitting unit.

With this configuration, because the connection portion of the translucent member includes the antireflection member, the antireflection member absorbs light from the light emitting unit. Thus, because light emitted onto the connection portion is absorbed by the antireflection member, the generation of stray light can be suppressed.

The connection portion is preferably formed by the curved surface having a radius larger than a maximum length of a light emitting surface of the light emitting unit.

With this configuration, because the connection portion of the translucent member is formed by an arc having the radius larger than the maximum length of the light emitting surface of the light emitting unit, the generation of stray light can be suppressed as compared with a case in which the connection portion is formed by an arc having a radius smaller than the maximum length of the light emitting surface of the light emitting unit.

The connection portion is preferably formed on a rough surface.

With this configuration, because the connection portion of the translucent member is formed on the rough surface, the generation of stray light can be suppressed as compared with a case in which a rough surface is not formed.

A photoelectric encoder of the present invention includes the light source device of the present invention, a scale onto which light is emitted from the light source device, and a light receiving unit configured to receive light from the light source device, via the scale, and to convert the received light into an electrical signal.

According to the present invention as described above, because the photoelectric encoder includes the light source device in the present invention, the photoelectric encoder can execute measurement using parallel light with suppressed stray light. Thus, the photoelectric encoder can achieve measurement accuracy enhancement.

BRIEF DESCRIPTION OF THE DRAWINGS

FIG. 2A is a side view of a light source device, FIG. 2B is a top view of the light source device, and FIG. 2C is a bottom view of the light source device;

DETAILED DESCRIPTION OF THE EMBODIMENTS

First Embodiment

A first embodiment of the present invention will be described below based on the drawings.

Figure 1:
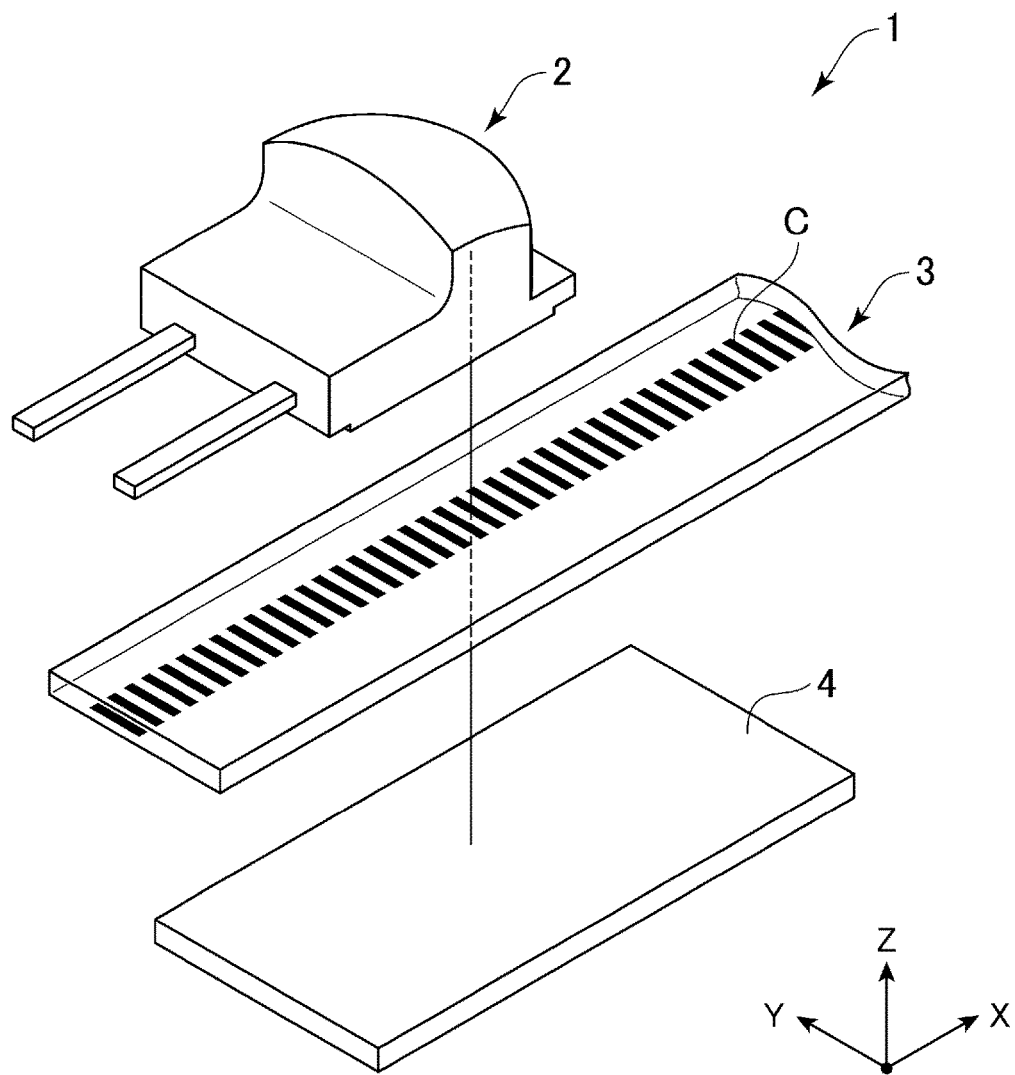
FIG. 1 is a perspective view illustrating an encoder according to a first embodiment of the present invention.

FIG. 1 is a perspective view illustrating an encoder according to the first embodiment of the present invention.

As illustrated in FIG. 1, an encoder 1 is a photoelectric encoder including a light source device 2 that emits parallel light, a scale 3 which is disposed with facing the light source device 2, and onto which light is emitted from the light source device 2, and a light receiving unit 4 that receives light from the light source device 2 via the scale 3, and converts the received light into an electrical signal.

The scale 3 is formed of translucent material such as glass, into an elongated shape, and includes an optical grid C alternately including transmissive portions and non-transmissive portions along a longitudinal direction (X direction) of the scale 3.

Parallel light emitted by the light source device 2 onto the scale 3, and transmitted through the optical grid C of the scale 3 generates interference fringes having the same cycle as the optical grid C, on the light receiving unit 4.

In the following description and the drawings, in some cases, the longitudinal direction of the scale 3 and a movement direction of the light source device 2 and the light receiving unit 4 are described as the X direction, a width direction (depth direction) of the scale 3 that is orthogonal to the X direction is described as a Y direction, and an up-down direction orthogonal to the X and Y directions is described as a Z direction.

Based on the interference fringes generated by parallel light transmitted through the optical grid C of the scale 3, the light receiving unit 4 converts a light amount change into an electrical signal. The encoder 1 detects a displacement amount by calculating electrical signals obtained by the light receiving unit 4. Here, a method of converting a light amount change of light transmitted through the scale 3, into an electrical signal is referred to as transmissive photoelectric conversion.

FIGS. 2A to 2C are a side view, a top view, and a bottom view of the light source device according to the first embodiment of the present invention. More specifically, FIG. 2A is a side view of the light source device 2, FIG. 2B is a top view of the light source device 2, and FIG. 2C is a bottom view of the light source device 2.

As illustrated in FIGS. 2A to 2C, the light source device 2 includes a light emitting unit 5 that emits light, and a translucent member 10 that accommodates the light emitting unit 5 thereinside, and makes light emitted from the light emitting unit 5, into parallel light.

As the light emitting unit 5, for example, a light emitting diode is used.

The translucent member 10 includes an optical axis plane 11 positioned on an optical path of the light emitting unit 5, and being parallel to an optical axis L of the light emitting unit 5, an orthogonal plane 12 formed with being connected to an end portion on the light emitting unit 5 side (−Z direction side) of the optical axis plane 11, positioned on the optical path of the light emitting unit 5, and being orthogonal to the optical axis L of the light emitting unit 5, a paraboloidal surface 13 formed with being connected to an end portion on an opposite side (+Z direction side) of the light emitting unit 5 of the optical axis plane 11 toward an opposite side (+X direction side) of the orthogonal plane 12, and making light from the light emitting unit 5, into parallel light, a connection portion 14 formed by the optical axis plane 11 and the orthogonal plane 12 connecting to each other, and having a curved surface whose a central axis AX is parallel to a Y-axis, in an outside region of the translucent member 10, and a region between the optical axis plane 11 and the orthogonal plane 12, and a lead frame 15 for a power source that connects the light source device 2 and a power source (not illustrated).

The translucent member 10 is integrally molded by injecting transparent resin into a die or the like, for example. The light emitting unit 5 accommodated inside the translucent member 10 is disposed on an extended line of the optical axis plane 11.

Figure 3:
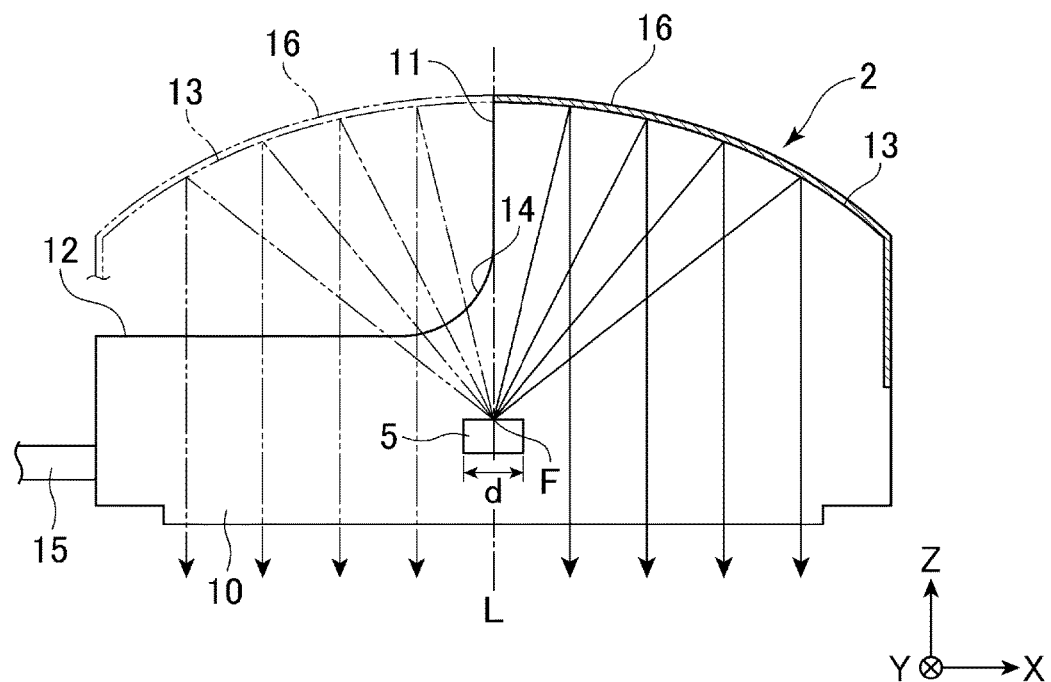
FIG. 3 is a cross-sectional view illustrating arrangement of a light emitting unit according to the first embodiment of the present invention.

FIG. 3 is a cross-sectional view illustrating arrangement of the light emitting unit according to the first embodiment of the present invention. More specifically, FIG. 3 is a cross-sectional view of an A-A cross section of the light source device 2 in FIG. 2B.

As illustrated in FIG. 3, the paraboloidal surface 13 has, on its surface, a reflection member 16 that reflects light from the light emitting unit 5, as parallel light.

Because the light emitting unit 5 is disposed at a focus F of the paraboloidal surface 13, light emitted from the light emitting unit 5 onto the paraboloidal surface 13 is reflected by the reflection member 16 and is emitted from the light source device 2 as parallel light. Thus, in the present embodiment, the paraboloidal surface 13 and the reflection member 16 constitute a reflection portion. The same applies to the following embodiments.

Figure 4:
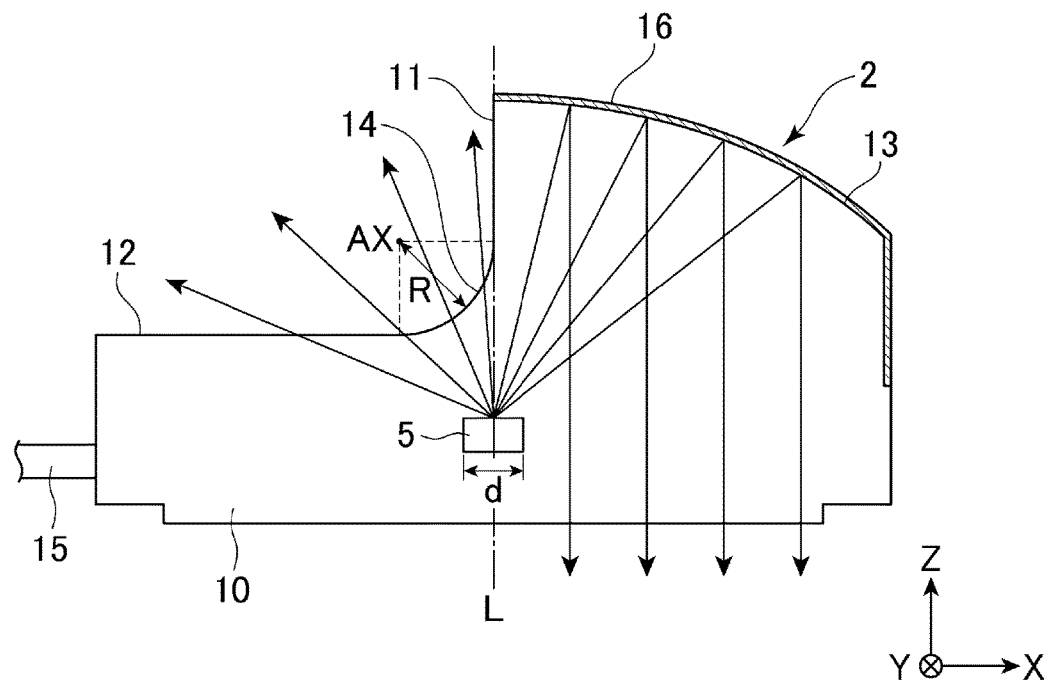
FIG. 4 is a cross-sectional view illustrating a light source device according to the first embodiment of the present invention.

FIG. 4 is a cross-sectional view illustrating the light source device according to the first embodiment of the present invention. More specifically, FIG. 4 is a cross-sectional view of the A-A cross section of the light source device 2 in FIG. 2B.

The connection portion 14 is formed by the curved surface corresponding to a circumferential surface of a true cylinder having an axis parallel to the Y-axis, as the central axis AX. A radius R of the true cylinder is set to be larger than a maximum length d of a light emitting surface of the light emitting unit 5. The maximum length d of the light emitting surface of the light emitting unit 5 is a maximum length of the light emitting surface being a portion emitting light of the light emitting diode. For example, when light is emitted from a part of the light emitting surface via a slit, the maximum length d is a maximum length of a portion of the light emitting surface that corresponds to the slit.

The translucent member 10 emits parallel light by reflecting, on the reflection member 16, light from the light emitting unit 5 that has been emitted toward the +X direction side with respect to the optical axis plane 11. The translucent member 10 emits light from the light emitting unit 5 that has been emitted toward the −X direction side with respect to the optical axis plane 11, to the outside by causing the light to be transmitted through the orthogonal plane 12 and the connection portion 14.

According to the present embodiment as described above, the following functions and effects can be brought about.

Figure 7:
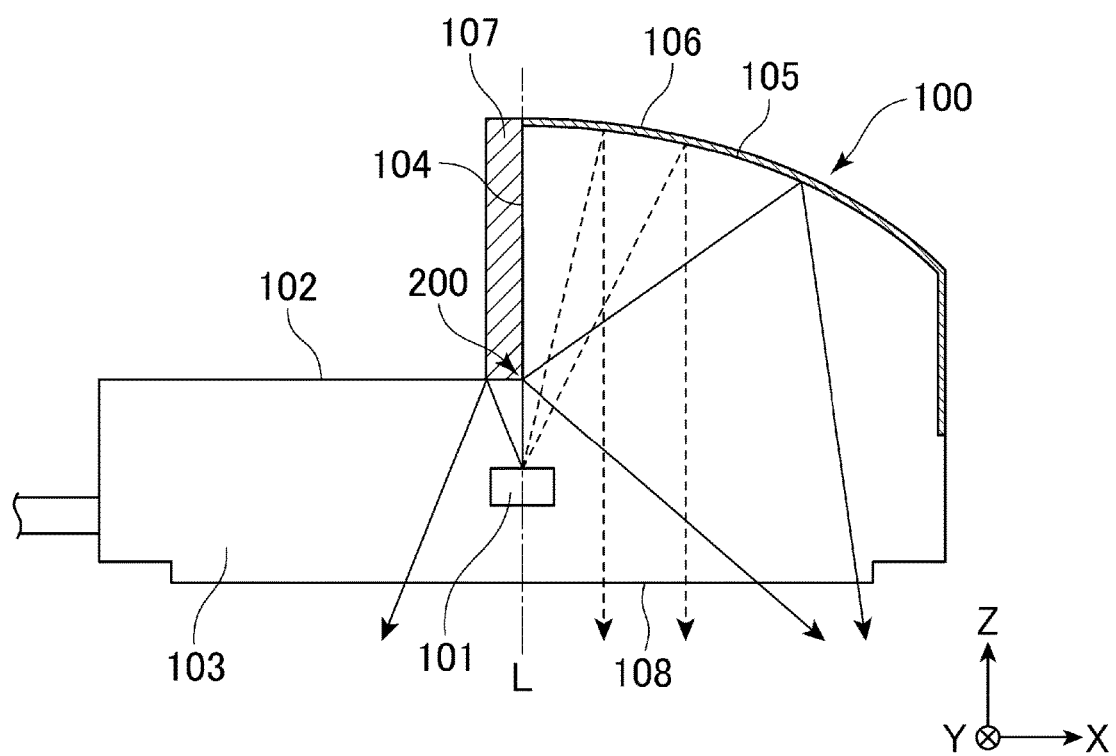
FIG. 7 is a cross-sectional view illustrating a conventional light emission unit.

(1) Because the connection portion 14 of the translucent member 10 in the light source device 2 is formed into a curved surface shape, a scattering point of light such as the corner portion 200 illustrated in FIG. 7 is not generated. Thus, the light source device 2 can achieve higher accuracy while maintaining reliability by reducing stray light.

(2) Because the translucent member 10 includes the paraboloidal surface 13 formed toward the +X direction side of the optical axis plane 11, the light source device 2 can be downsized while ensuring necessary parallel light.

(3) Because the translucent member 10 includes the connection portion 14 with curved surface, when the translucent member 10 is molded by injecting transparent resin into a die or the like, the translucent member 10 can be easily demolded from the die or the like after the molding.

(4) Because the connection portion 14 of the translucent member 10 is formed by an arc having the radius R larger than the maximum length d of the light emitting surface of the light emitting unit 5, the generation of stray light can be suppressed as compared with a case in which the connection portion 14 is formed by an arc having a radius R smaller than the maximum length d of the light emitting surface of the light emitting unit 5.

Second Embodiment

A second embodiment of the present invention will be described below based on the drawings.

In the following description, parts that have been already described are assigned the same signs, and the descriptions thereof will be omitted.

Figure 5:
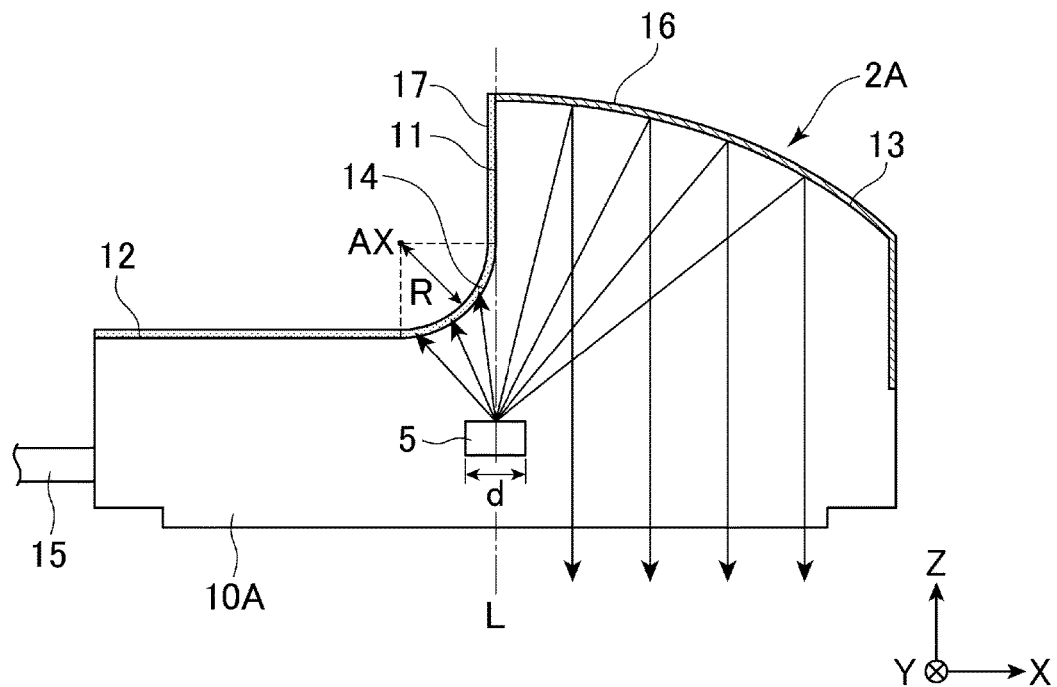
FIG. 5 is a cross-sectional view illustrating a light source device according to a second embodiment of the present invention.

FIG. 5 is a cross-sectional view illustrating a light source device according to the second embodiment of the present invention. More specifically, FIG. 5 is a cross-sectional view of the A-A cross section of the light source device 2 in FIG. 2B.

In the light source device 2 of the aforementioned first embodiment, light emitted onto the connection portion 14 is transmitted through the curved surface of the connection portion 14 to be emitted to the outside of the translucent member 10. Here, in some cases, part of the light emitted onto the connection portion 14 is reflected to the paraboloidal surface 13 without being transmitted through the connection portion 14. In view of this, the present embodiment differs from the aforementioned first embodiment in that a translucent member 10A of a light source device 2A further includes an antireflection member 17 on the surfaces of the optical axis plane 11, the orthogonal plane 12, and the connection portion 14.

As illustrated in FIG. 5, the antireflection member 17 prevents, among light from the light emitting unit 5, light emitted onto the optical axis plane 11, the orthogonal plane 12, and the connection portion 14, from being reflected toward the paraboloidal surface 13, and absorbs the light. The antireflection member 17 is formed by, for example, vapor-depositing an antireflection film on the optical axis plane 11, the orthogonal plane 12, and the connection portion 14, blackening the optical axis plane 11, the orthogonal plane 12, and the connection portion 14, and the like.

In the present embodiment as described above, the following functions and effects are caused in addition to functions and effects similar to (1) to (4) in the aforementioned first embodiment.

(5) Because the connection portion 14 of the translucent member 10A includes the antireflection member 17, the antireflection member 17 absorbs light from the light emitting unit 5. Thus, because light emitted onto the connection portion 14 is absorbed by the antireflection member 17, the generation of stray light can be suppressed.

Third Embodiment

A third embodiment of the present invention will be described below based on the drawings.

In the following description, parts that have been already described are assigned the same signs, and the descriptions thereof will be omitted.

Figure 6:
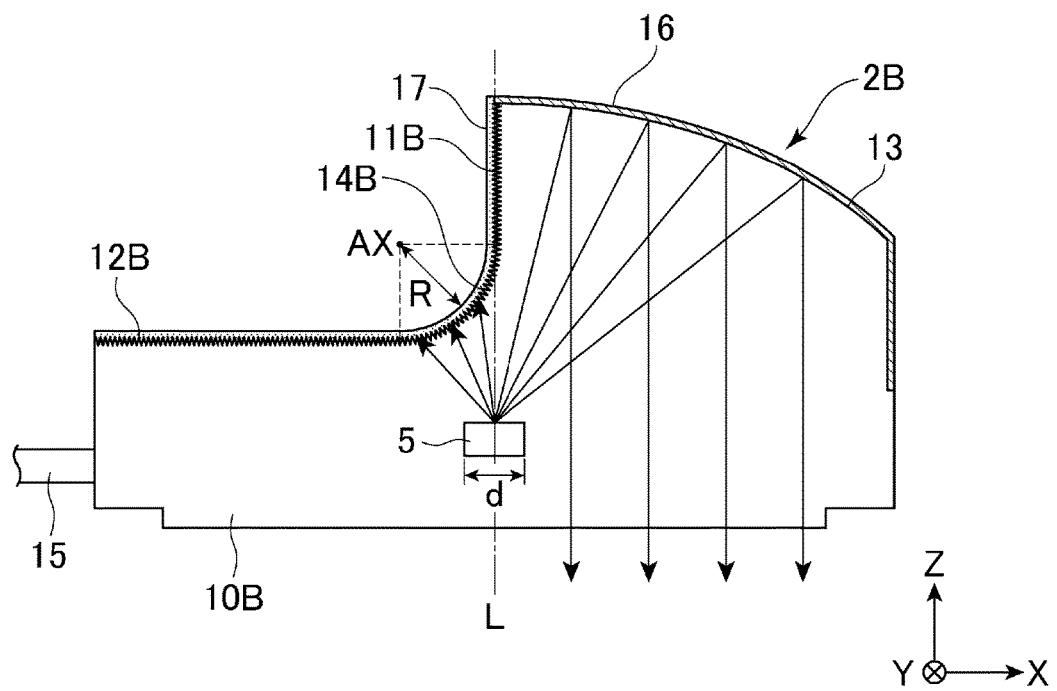
FIG. 6 is a cross-sectional view illustrating a light source device according to a third embodiment of the present invention.

FIG. 6 is a cross-sectional view illustrating a light source device according to the third embodiment of the present invention. More specifically, FIG. 6 is a cross-sectional view of the A-A cross section of the light source device 2 in FIG. 2B.

In the light source device 2 of the aforementioned first embodiment and the light source device 2A of the aforementioned second embodiment, the optical axis plane 11 and the orthogonal plane 12 include planes having smooth surfaces, and the connection portion 14 similarly includes a curved surface having a smooth surface. In contrast to this, the present embodiment differs from the aforementioned second embodiment in that an optical axis plane 11B and an orthogonal plane 12B in a light source device 2B of the present embodiment include rough surfaces, and furthermore, a curved surface of a connection portion 14B similarly includes a rough surface.

As illustrated in FIG. 6, because the optical axis plane 11B, the orthogonal plane 12B, and the connection portion 14B of the light source device 2B include rough surfaces, the generation of stray light from light from the light emitting unit 5 is suppressed as compared with the optical axis plane 11, the orthogonal plane 12, and the connection portion 14 in the aforementioned first and second embodiments. The rough surfaces are molded by, for example, roughening in advance portions of a mold that correspond to the optical axis plane 11B, the orthogonal plane 12B, and the connection portion 14B, by sandblast or the like, when a translucent member 10B is molded by injecting resin into the mold or the like, for example.

In the aforementioned present embodiment, the following functions and effects are caused in addition to functions and effects similar to those in the aforementioned first and second embodiments.

(6) Because the connection portion 14B of the translucent member 10B is formed on the rough surface, the generation of stray light can be suppressed as compared with a case in which a rough surface is not formed.

Modification of Embodiments

In addition, the present invention is not limited to the aforementioned embodiments, and modifications, alterations, and the like that fall within the scope capable of accomplishing the object of the present invention are included in the present invention.

For example, in the aforementioned embodiments, the description has been given of a case in which the light source device 2 or 2B being the present invention is used in the encoder 1. Nevertheless, the light source device 2 or 2B can be used in other measuring devices and the like, and a device on which the light source device 2 or 2B is to be mounted is not especially limited.

In addition, the encoder 1 has been described as a transmissive photoelectric encoder that causes light from the light source device 2 or 2B to be transmitted. Alternatively, the encoder 1 may be a reflective photoelectric encoder in which the light receiving unit 4 receives light reflected from the optical grid C.

In the aforementioned embodiments, the connection portion 14 or 14B is provided with a curved surface corresponding to the circumferential surface of the true cylinder having equal lengths from the optical axis plane 11 or 11B and the orthogonal plane 12 or 12B to the central axis AX. Alternatively, the connection portion 14 or 14B may be provided with a curved surface corresponding to a circumferential surface of a cylinder having different lengths from the optical axis plane 11 or 11B and the orthogonal plane 12 or 12B to the central axis AX.

In the aforementioned first embodiment, the reflection member 16 is provided on the paraboloidal surface 13. Nevertheless, the reflection member 16 may be provided also on the optical axis plane 11 in addition to the paraboloidal surface 13.

In the aforementioned second embodiment, the optical axis plane 11 and the orthogonal plane 12 are provided with the antireflection member 17. Nevertheless, the antireflection member 17 is only required to be provided on the connection portion 14, and the optical axis plane 11 and the orthogonal plane 12 need not be provided with the antireflection member 17.

In the aforementioned third embodiment, rough surfaces are formed on the optical axis plane 11B and the orthogonal plane 12B. Nevertheless, a rough surface is only required to be formed on the connection portion 14B, and a rough surface needs not be formed on the orthogonal plane 12B. The optical axis plane 11B, the orthogonal plane 12B, and the connection portion 14B are provided with the antireflection member 17. Nevertheless, the optical axis plane 11B, the orthogonal plane 12B, and the connection portion 14B need not be provided with the antireflection member 17.

In the aforementioned embodiments, the reflection portion includes the paraboloidal surface 13. Nevertheless, a surface included in the reflection portion is not limited to the paraboloidal surface 13, and the reflection portion may include a surface having another shape. In other words, the reflection portion may have any configuration as long as the configuration can make light from the light emitting unit 5, into parallel light.

INDUSTRIAL APPLICABILITY

As described above, the present invention can be preferably used in a light source device and a photoelectric encoder including the same.

What is claimed is:

1. A light source device comprising a light emitting unit configured to emit light, and a translucent member configured to accommodate the light emitting unit thereinside, and to make light emitted from the light emitting unit, into parallel light, wherein the translucent member includes:

an optical axis plane positioned on an optical path of the light emitting unit, and being parallel to an optical axis of the light emitting unit;

an orthogonal plane formed with being connected to an end portion on a light emitting unit side of the optical axis plane, positioned on the optical path of the light emitting unit, and being orthogonal to the optical axis of the light emitting unit;

a reflection portion formed with being connected to an end portion on an opposite side of the light emitting unit of the optical axis plane toward an opposite side of the orthogonal plane, and configured to make light from the light emitting unit, into parallel light; and a connection portion formed by the optical axis plane and the orthogonal plane connecting to each other, and having a curved surface, a central axis of the curved surface being in an outside region of the translucent member and a region between the optical axis plane and the orthogonal plane.

2. The light source device according to claim 1,
wherein the connection portion includes
an antireflection member configured to absorb light from the light emitting unit.

3. The light source device according to claim 1,
wherein the connection portion is
formed by the curved surface having a radius larger than a maximum length of a light emitting surface of the light emitting unit.

4. The light source device according to claim 1,
wherein the connection portion is formed on a rough surface.

5. A photoelectric encoder comprising:
the light source device according to claim 1;
a scale onto which light is emitted from the light source device; and
a light receiving unit configured to receive light from the light source device, via the scale, and to convert the received light into an electrical signal.

* * * * *